United States Patent
Loucks

(10) Patent No.: US 8,387,056 B2
(45) Date of Patent: *Feb. 26, 2013

(54) METHOD FOR DYNAMICALLY ENABLING THE EXPANSION OF A COMPUTER OPERATING SYSTEM

(75) Inventor: Jeffry Harlow Loucks, Gig Harbor, WA (US)

(73) Assignee: Access Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/684,943

(22) Filed: Jan. 10, 2010

(65) Prior Publication Data

US 2010/0115525 A1      May 6, 2010

Related U.S. Application Data

(63) Continuation of application No. 09/965,374, filed on Sep. 26, 2001, now Pat. No. 7,647,591.

(51) Int. Cl.
*G06F 9/46*      (2006.01)

(52) U.S. Cl. .................. 718/102; 718/103; 718/104

(58) Field of Classification Search .............. 718/102
See application file for complete search history.

(56) References Cited

U.S. PATENT DOCUMENTS

| | | | |
|---|---|---|---|
| 5,012,409 A | 4/1991 | Fletcher et al. | 718/103 |
| 5,193,189 A * | 3/1993 | Flood et al. | 718/103 |
| 5,404,536 A * | 4/1995 | Ramakrishnan et al. | 710/220 |
| 5,542,088 A * | 7/1996 | Jennings et al. | 718/103 |
| 5,612,866 A * | 3/1997 | Savanyo et al. | 700/86 |
| 5,742,825 A | 4/1998 | Mathur et al. | 719/329 |
| 5,907,701 A | 5/1999 | Hanson | 718/101 |
| 6,021,425 A | 2/2000 | Waldron et al. | 718/103 |
| 6,092,095 A | 7/2000 | Maytal | 718/100 |
| 6,098,090 A | 8/2000 | Burns | 718/107 |
| 6,330,583 B1 | 12/2001 | Reiffin | 718/105 |
| 6,430,594 B1 | 8/2002 | Akiyama et al. | 718/108 |
| 6,499,050 B1 | 12/2002 | Boswell et al. | 718/107 |
| 6,757,897 B1 | 6/2004 | Shi et al. | 718/102 |
| 6,948,172 B1 | 9/2005 | D'Souza | 718/106 |

* cited by examiner

*Primary Examiner* — Jennifer To
(74) *Attorney, Agent, or Firm* — Berry & Assocates P.C.

(57) ABSTRACT

A method for scheduling tasks in a computer operating system comprises a background task creating at least one registered service. The background task provides an execution presence and a data present to a registered service and ranks the registered services according to the requirements of each registered service. The background task also allocates an execution presence and a data presence according to each of the registered services such that each of the registered services is given an opportunity to be scheduled in the dedicated pre-assigned time slice.

16 Claims, 4 Drawing Sheets ated systems. Specifically, the present invention relates to a method for dynamically enabling the expansion of a computer operating system of a portable electronic device.
METHOD FOR DYNAMICALLY ENABLING THE EXPANSION OF A COMPUTER OPERATING SYSTEM

CROSS REFERENCE TO RELATED APPLICATIONS

This application is a continuation application of application Ser. No. 09/965,374, now U.S. Pat. No. 7,647,591, entitled "A METHOD FOR DYNAMICALLY ENABLING THE EXPANSION OF A COMPUTER OPERATING SYSTEM," filed Sep. 26, 2001, and assigned to the assignee of the present application. The subject matter in the above-identified co-pending and commonly owned application is incorporated herein by reference.

FIELD OF INVENTION

The present invention relates to the field of computer operating systems. Specifically, the present invention relates to a method for dynamically enabling the expansion of a computer operating system of a portable electronic device.

BACKGROUND OF THE INVENTION

In some palmtop computer systems, all services or applications running on the operating system are required to run through a single thread (e.g., task). Typically, this thread is a foreground thread. While the operating system is classified as multitasking, all user interfacing and most resource related activities are done under the foreground thread. In these computer systems, all services, whether they are related to system activities, interrupt activities, background activities, or foreground activities, must operate to some extent in the foreground thread.

Under current system architecture, the operating system comprises a kernel. The kernel provides many essential functions required by the operating system and other services. Among these essential functions is operating a scheduler. The kernel allows the operating system to allocate slices of time (e.g., execution context) and memory (e.g., data context) of the foreground thread to services, typically as they are ordered in an event queue. The kernel essentially operates as a traffic light, allocating resources to tasks as they are ranked in priority.

Once a service receives an execution context, the operating system is dependent on the service ceding control of the foreground thread. If a service does not cede control of the foreground thread, other services are prevented from operating. All activities operating on the foreground thread must be disciplined enough to allow that to happen or else the operating system comes to a halt. This is not often the case, as background-related activities (e.g., hardware management, communications protocols, and infrared protocols) are required to share the operating system with foreground related activities (e.g., the graphical user interface). If a foreground activity does not cede control of the foreground thread, background activities are prevented from operating.

Additionally, some computer operating systems do not provide a mechanism where third party applications and tasks can access the kernel for receiving an execution presence independent of the foreground tasks. For example, some kernel developers do not like to give out their code to third party developers, thus further limiting the number of predetermined services that are hardwired into the kernel. In these operating systems, kernel access is prohibited to third party developers. Thus, it is not possible for third party applications to receive an execution context from the scheduler, thus preventing the third party applications from operating.

Palmtop computer systems, as with most computer systems, often have a number of interrupt service routines. For an interrupt service routine to be reliably executed on many palmtop computer systems, the interrupt must be pre-built into the operating system. A pre-built interrupt is contained in a reserved area on the operating system. A number of users often desire to install third party interrupt service routines into their palmtop computer systems.

The only way to add an interrupt service routine after the operating system is built is to couple the interrupt routine to the foreground task. This does not provide a reliable interrupt routine because it cannot be predicted with certainty if the interrupt will receive its time to run. Current third party interrupt service routine developers are forced to rely on the behavior of the foreground task in granting the service routine time to run.

Currently, no mechanism exists to permit third party interrupt service routines to operate reliably, other than pre-building them into the operating system. Thus, third party interrupt service routines may not be reliably executed on the current system architecture.

SUMMARY OF THE INVENTION

Accordingly, a need exists for a method and system for scheduling tasks in a computer operating system that provides background threads, interrupt services and system services with an execution presence and data context, and where these services are not dependent on the foreground thread giving the time up. A need also exists for a method and system that allows third party applications access an execution presence and data context without necessitating that the third party application directly access the kernel. A need also exists for a method and system that allows for the operation of an interrupt event that does not have an interrupt mechanism pre-built into the operating system.

A method for scheduling tasks in a computer operating system independent of foreground and user interface tasks is described. A service manager, operating independently of any foreground task, has registered with it services to be scheduled. The service manager scheduled by a kernel registers at least one service associated with the service manager. The service manager operates on the computer operating system and is invoked by a kernel of the computer operating system in a dedicated pre-assigned time slice that is scheduled independently of any foreground or user interface task.

The service manager provides an execution presence (e.g., time) and a data presence (e.g., memory) to a registered service, by allocating to the registered service a part of its pre-assigned time slice. In one embodiment, the data presence is an AS-based global variable context, for instance. In one embodiment, the service manager ranks the registered services according to the requirements and needs of each of registered services. The background task allocates an execution presence and a data presence accordingly to each of the registered services such that each of the registered services is given an opportunity to be scheduled in the dedicated pre-assigned time slice.

In one embodiment, the service manager searches for services associated therewith. In the present embodiment, the service manager scans the operating system for services. Upon finding a service, the service manager automatically loads (e.g., registers) the service. In one embodiment, the service manager periodically repeats its search for associated services, and is scheduled itself by a kernel of an operating system.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
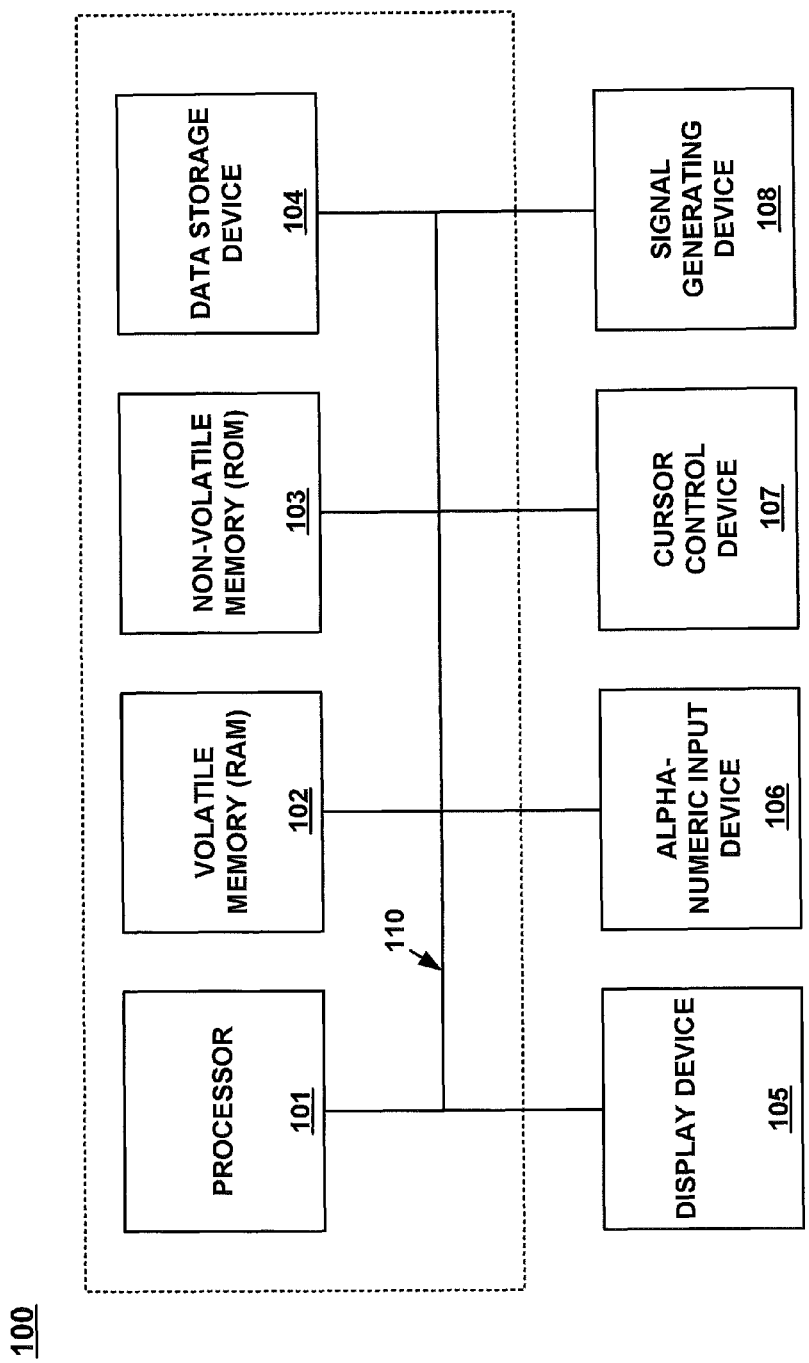
FIG. 1 is a logical block diagram of an exemplary palmtop computer system in accordance with an embodiment of the present invention.

Reference will now be made in detail to the preferred embodiments of the present invention, a method for scheduling tasks in a computer operating system independent of foreground and user interface tasks, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims, Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "registering" or "ranking" or "allocating" or "searching" or "scheduling" or the like, refer to the action and processes of a computer system (e.g., process 300 of FIG. 3 or process 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

The present invention Is discussed primarily in the context of a portable computer system, such as a palmtop or personal digital assistant, with telephony functionality, allowing the portable computer system to act as a cellular phone. However, it is appreciated that the present invention can be used with other types of devices that have the capability to access some type of central device or central site, including but not limited to laptop computer systems.

Exemplary Palmtop Computer System Platform

One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a stand-alone computer system, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Referring now to FIG. 1, portions of the present electronic system are comprised of computer-readable and computer-executable instructions which reside, for example, in computer-readable media of an electronic system (e.g., personal digital assistant, computer system, and the like). FIG. 1 is a block diagram of exemplary interior components of an exemplary electronic device, an example of which is personal digital assistant, upon which embodiments of the present invention may be implemented. It is appreciated that the exemplary PDA 100 of. FIG. 1 is only exemplary and that the present invention can operate within a number of different electronic systems including general purpose networked computer systems, embedded computer systems, and stand-alone electronic systems such as a cellular telephone or a pager.

FIG. 1 illustrates circuitry of an exemplary electronic system or computer system 100 (such as the personal digital assistant), some of which can be implemented on a PC board. Exemplary computer system 100 includes an address/data bus 110 for communicating information, a central processor 101 coupled with the bus 110 for processing information and instructions, a volatile memory 102 (e.g., random access memory (RAM), static RAM dynamic RAM, etc.) coupled with the bus 110 for storing information and instructions for the central processor 101 and a non-volatile memory 103 (e.g., read only memory (ROM), programmable ROM, flash memory, EPROM, EEPROM, etc.) coupled to the bus 110 for storing static information and instructions for the processor 101. Exemplary computer system 100 also includes an optional data storage device 104 (e.g., memory card, hard drive, etc.) coupled with the bus 110 for storing information and instructions. Data storage device 104 can be removable. As described above, exemplary computer system 100 also contains an electronic display device 105 coupled to the bus 110 for displaying information to the computer user. In one embodiment, a PC board can contain the processor 101, the bus 110, the RAM 102 and the ROM 103.

Also included in computer system 100 of FIG. 1 is an alphanumeric input device 106 which in one implementation is a handwriting recognition pad ("digitizer"). Device 106 can communicate information (spatial data and pressure data) and command selections to the central processor 901. System 100 also includes an optional cursor control or directing device 107 coupled to the bus for communicating user input information and command selections to the central processor 101. In one implementation, device 107 is a touch screen device incorporated with display 105. Device 107 is capable of registering a position on the display 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Figure 2:
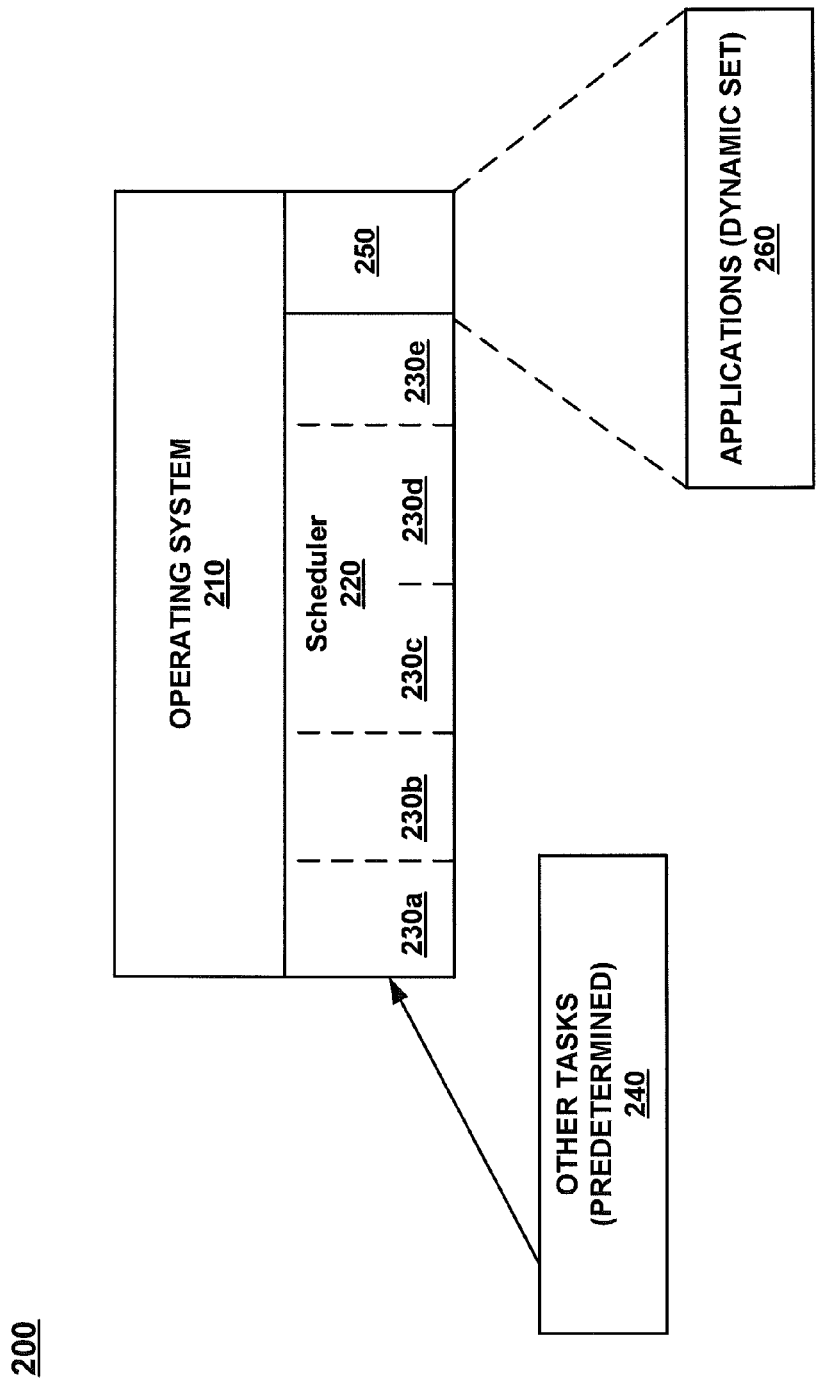
FIG. 2 is a block diagram of the task scheduling mechanism of a computer operating system in accordance with an embodiment of the present invention.
Figure 4:
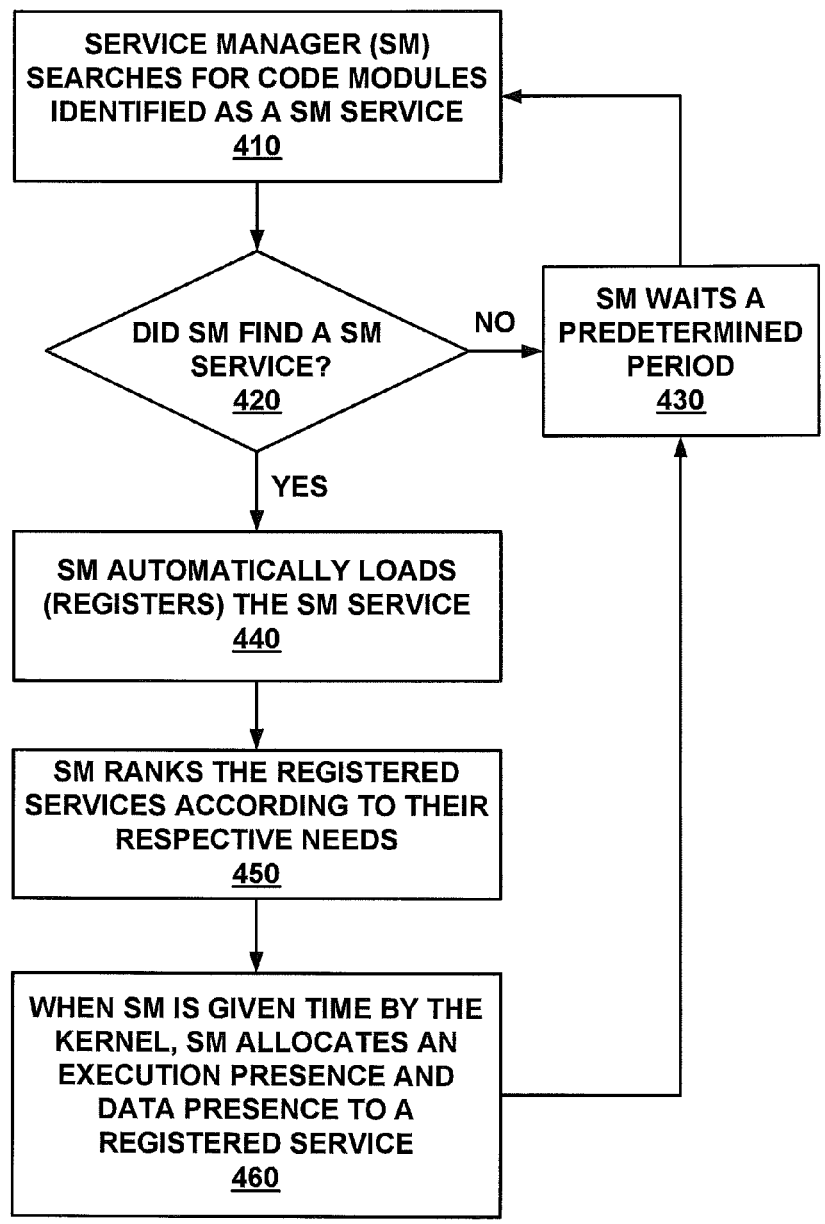
FIG. 4 is a flowchart diagram of a process for scheduling services on a service manager resident on a background task of a computer operating system in accordance with an embodiment of the present invention.

With reference still to FIG. 4, exemplary computer system 100 also includes a signal input/output device 108 which is coupled to bus 110 for providing a communication link between computer system 100 and a network environment. As such signal input/output device 108 enables central processor unit 101 to communicate wirelessly with other electronic systems coupled to the network. It should be appreciated that within the present embodiment, signal input/output device 108 is coupled to an antenna and provides the functionality to transmit and receive information over a wireless communication interface. It should be further appreciated that the present embodiment of signal input/output device 108 is well-suited to be implemented in a wide variety of ways. For example, signal input/output device 108 could be implemented as a modem. Further, signal input/output communication device 108, also coupled to bus 110, can be a serial port for communicating a with the cradle. Additionally, device 108 can also include an infrared communication port. Method for Dynamically Enabling the Expansion of a Computer Operating System of a Portable Electronic Device FIG. 2 is a block diagram for the task scheduling process 200 of a computer operating system 210 in accordance with an embodiment of the present invention. In one embodiment, computer operating system 210 is operable on a palmtop computer system (e.g., palmtop computer system 100 of FIG. 1). In one embodiment, a scheduler, task scheduling mechanism 220 is a kernel, responsible for performing essential functions of computer operating system 210.

Scheduling mechanism 220 performs the essential function of scheduling processor time for tasks (also known as threads) running on operating system 210. Scheduling mechanism 220 allocates slices of processor time (e.g., processor 101 of FIG. 1) to a number of tasks. Each task (e.g., tasks 230a-230e) is pre-assigned to a slice of time. It should be appreciated that scheduling mechanism 220 is not limited to any number of time slices, but can allocate any number of time slices resident in computer operating system 210. It is appreciated that scheduling mechanism 220 schedules its tasks independent of flow control from any foreground applications or services, including user interface tasks.

Scheduling mechanism 220 gives processing time to each task based on the specific needs of each task. In one embodiment, scheduling mechanism 220 ranks each task based on a variety of indicators, including but not limited to task priority and resource need rating. Based on the ranking, scheduling mechanism 220 allocates a time slice to each task.

In one embodiment, tasks 230a-230e comprise predetermined tasks (e.g., tasks that are pre-programmed into the operating system). These tasks are built into the operating system, and generally cannot be dynamically changed by the user. Tasks 230a-230e may comprise any number of tasks, including but not limited to: operating the graphical user interface, accessing a network library, operating an infrared data transfer port, synchronizing a palmtop computer system to a desktop computer system, and operating sound functionality, In one embodiment of the present invention, the tasks comprise a background thread 250 or service manager. Background thread 250 is allocated a pre-assigned time slice by scheduling mechanism 220. Background thread 250 provides an execution context and data presence for background, system, and interrupt-related activities. Furthermore, background thread 250 may be scheduled independently of all other foreground tasks.

In one embodiment of the present invention, background thread 250 comprises a service manager (e.g., the service manager of FIGS. 3 and 4, infra) for allocating its time slice to a set of dynamically registered services or applications 260. Set of applications 260 are comprised of a dynamic set of applications that can be altered by third party developers, as opposed to tasks 230a-230e, which cannot generally be altered or changed. As such, third party applications, and other applications and services not built into the operating system, may receive an execution context from background task 250.

Service manager registered applications 260 generally are background, system, and interrupt services, and may include hardware management such as radios, flash ROM, plug and play, battery chargers and sound, and communication protocols such as IrDA, Bluetooth, TCP/IP listeners and synchronization applications.

Figure 3:
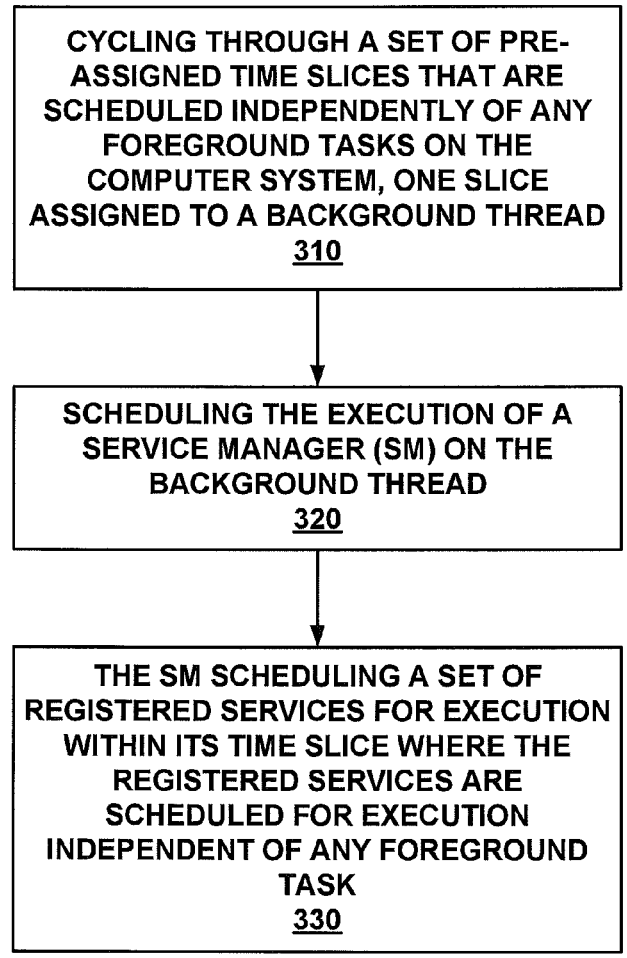
FIG. 3 is a flowchart diagram of a process for scheduling tasks on a computer operating system in accordance with an embodiment of the present invention.

FIG. 3 is a flowchart diagram of a process 300 for scheduling tasks on a computer operating system in accordance with an embodiment of the present invention. In one embodiment, process 300 operates on the computer operating system of a palmtop computer system (e.g., palmtop computer system 100 of FIG. 1).

At step 310 of process 300, the computer operating system cycles through a set of pre-assigned time slices of processor time. Each time slice is associated with a task of the computer operating system, wherein one of the tasks is a background task. The tasks may comprise activities such as operating the graphical user interface, accessing a network library, operating an infrared data transfer port, synchronizing a palmtop computer system to a desktop computer system, and operating sound functionality.

In one embodiment, the computer operating system continues to cycle through the time slices of processing time. These time slices are allocated by the scheduling mechanism of the computer operating system. The associated tasks (e.g., tasks 230a through 230e and 250 of FIG. 2) are all scheduled independently of any foreground task. In one embodiment the scheduling mechanism is a kernel for managing essential functions of the computer operating system.

At step 320, the background thread time slice is allocated its processing time and executes. The background thread comprises a service manager. The service manager operates as a scheduler for a set of service manager services, thus providing a context for service manager services.

At step 330, the service manager allocates its time slice to a set of registered services. The service manager operates similarly to the scheduling mechanism as described above.

FIG. 4 is a flowchart diagram of a process 400 for scheduling services on a service manager resident on a background task of a computer operating system in accordance with an embodiment of the present invention.

At step 410 of process 400, when active and scheduled by the kernel, the service manager searches for code modules identified as a service manager service. In one embodiment, service manager services are code modules comprising both service code and optional extensions libraries. Service manager services are dynamically installed, enabled, disabled, and removed. In one embodiment, each service owns an A5 based global data context.

In one embodiment, the service manager searches the both the volatile memory and non-volatile memory (e.g., RAM 102 and ROM 103 of FIG. 1) of the computer system for the service manager code modules. Service manager services may include hardware management tools (e.g., radios, flash ROM, battery chargers, and sound) and communications protocols (e.g., infrared data transfer, Bluetooth, and TCP/IP listeners), Service manager services may be third party applications, and may include interrupt related activities.

At step 420, it is determined whether the service manager has found a associated service manager service. If the service manager has not found an associated service, as shown at step 430, the service manager waits a predetermined period, and returns to step 410 to search for associated services.

If the service manager has found an associated service, as shown at step 440, the service manager automatically loads (e.g., registers) the service manager service. By registering the service, the service manager may allocate processing its processing time to the registered service.

At step 450, in one embodiment of the present invention, the service manager ranks the priority level of the registered service. The service manager may rank the priority level of a registered service in any number of ways. In one embodiment, the service manager considers the specific needs of each task. In one embodiment, the service manager ranks the priority level based on a variety of indicators, including but not limited to task priority and resource need rating.

At step 460, when the service manager is allocated its slice of processor time, (as shown at step 320 of FIG. 3, supra) the service manager allocates an execution presence to a registered service. This is done independently of any foreground task that may be operating on the system. In one embodiment, the registered service executed is the least recently used with the highest priority ranking, as calculated at step 450. It should be appreciated that the service manager may allocate its time slice however it determines is appropriate, and that the present invention provides a method and a system for allocating that time slice to service manager services.

In the event that the registered service is a third party application, the service manager operates to allocate an execution presence (e.g., processing time) to the application. Where the registered service is an interrupt service routine, the service manager further operates to allocate a data presence (e.g., memory) to the interrupt service routine.

The present invention provides a method and system for scheduling tasks in a computer operating system that provides a background thread for supplying services with an execution presence and data context, where the background thread is not dependent on the foreground thread giving the time up. The present invention also provides a method and system that allows third party applications access an execution presence and data context without necessitating that the third party application directly access the kernel. The present invention also provides a method and system that allows for the operation of an interrupt event that does not have an interrupt mechanism pre-built into the operating system.

The service manager concept facilitates dynamic expansion of the computer operating system by allowing services to be installed and removed at will. The service manager decouples background, system, and interrupt-related activities from foreground activities, thus improving the performance and integrity of the computer operating system.

The preferred embodiment of the present invention, a method for dynamically enabling the expansion of a computer operating system, is thus described. While the present invention has been described in particular embodiments, it should be appreciated that the present invention should not be construed as limited by such embodiments, but rather construed according to the below claims.

What is claimed is:

1. A method for scheduling time on a processor of an electronic device, the method comprising the steps of:
executing a task scheduling mechanism on a processor of an electronic device, the task scheduling mechanism configured to allocate one or more portions of processing time of the processor to one or more tasks, wherein at least one task is independent of flow control from any foreground application or service;
searching, using the processor, a memory of the electronic device for one or more services or applications and registering each found service or application within a service management mechanism, the at least one task comprising the service management mechanism; and
processing the at least one task on the processor of the electronic device during the allocated processing time for the at least one task, the service management mechanism configured to allocate its processing time according to the needs of the found services or applications independent of flow control from any foreground application or service wherein the found services or applications are processed according to a ranking provided by the service management mechanism and wherein the ranking includes a task priority and resource need rating.

2. A method according to claim 1, wherein the one or more tasks are background tasks.

3. A method according to claim 1, wherein the service management mechanism configured to allocate its processing time according to the needs of the found services or applications comprises providing an execution context and data context to the found services or applications.

4. A method according to claim 3 wherein the data presence is an A5-based global variable context.

5. A method according to claim 1, wherein the executing, searching, and processing steps are repeated periodically.

6. A method according to claim 1, further comprising de-registering a service or application from the service management mechanism.

7. A method according to claim 1 wherein the electronic device comprises a portable electronic device.

8. A method according to claim 1 wherein the found services or applications is from the group of: a system-related activity, an interrupt-related activity, and a background-related activity.

9. An electronic system comprising:
a processor coupled to a bus and
a first memory unit coupled to the bus having stored therein a task scheduling mechanism executed by the processor performing the steps of:
allocating one or more portions of processing time of the processor to more or more tasks, wherein at least one task is independent of flow control from any foreground application or service; and
a second memory unit coupled to the bus having stored therein a service management mechanism executed by the processor during the allocated time for the at least one task performing the steps of:
searching the first, the second, or a third memory coupled to the bus for one or more services or applications and registering each found service or application within the service management mechanism;
allocating processing time within the allocated time for the at least one task according to the needs of the found services or applications;
processing each found service or application according the service management mechanism processing time allocation within the at least one task wherein the found service or applications are processed according to a ranking provided by the service management mechanism and wherein the ranking includes a task priority and a resource need rating.

10. An electronic system according to claim 9, wherein service management mechanism allocation provides an execution context and data context to the found services or application.

11. An electronic system according to claim 10, wherein the data presence is an A5-based global variable context.

12. An electronic system according to claim 9, wherein the searching, allocating, and processing steps are repeated periodically.

13. An electronic system according to claim 9, wherein the service management mechanism further performs the step of de-registering a service or application.

14. An electronic system according to claim 9, wherein the electronic system is a portable electronic device.

15. An electronic system according to claim 9, wherein the found services or applications is from the group of: a system-related activity, an interrupt-related activity, a background-related activity.

16. An electronic system according to claim 9, wherein the one or more tasks are background tasks.

* * * * *